(12) United States Patent
Fling et al.

(10) Patent No.: US 8,183,867 B2
(45) Date of Patent: May 22, 2012

(54) LOCALIZATION SYSTEM FOR AN EARTH MOVING MACHINE

(75) Inventors: Richard Fling, Staffordshire (GB);
Simon Branson, Staffordshire (GB)

(73) Assignee: Leica Geosystems AG, Heerbrugg (CH)

( * ) Notice: Subject to any disclaimer, the term of this patent is extended or adjusted under 35 U.S.C. 154(b) by 242 days.

(21) Appl. No.: 12/515,571

(22) PCT Filed: Nov. 27, 2007

(86) PCT No.: PCT/EP2007/010262
§ 371 (c)(1),
(2), (4) Date: Apr. 27, 2010

(87) PCT Pub. No.: WO2008/064851
PCT Pub. Date: Jun. 5, 2008

(65) Prior Publication Data
US 2010/0207633 A1 Aug. 19, 2010

(30) Foreign Application Priority Data
Dec. 1, 2006 (CH) ......................................... 1952/06

(51) Int. Cl.
*G01V 3/08* (2006.01)
(52) U.S. Cl. ........................................ 324/326; 324/345
(58) Field of Classification Search .................... 324/67, 324/326, 345
See application file for complete search history.

(56) References Cited

U.S. PATENT DOCUMENTS

| | | | |
|---|---|---|---|
| 5,015,847 A | 5/1991 | Rouillon | |
| 5,592,092 A | 1/1997 | Mechler | |
| 6,633,163 B2 | 10/2003 | Fling | |
| 2002/0047709 A1 | 4/2002 | Fling | |

FOREIGN PATENT DOCUMENTS

EP 0 490 855 A1 6/1992

*Primary Examiner* — Bot Ledynh
(74) *Attorney, Agent, or Firm* — Maschoff Gilmore & Israelsen (57) ABSTRACT

The invention relates to a localization system for localizing an underground object for an earthmoving machine comprising a working part. The localization system comprises a fastening component and a detector component. The fastening component can be arranged on the working part for example by means of magnets. The detector component is adapted to detect the object using an electromagnetic field that can be associated with the object and is arranged on the fastening component so as to swing like a pendulum, thereby effecting an alignment of the detector component under the effect of gravity. Optionally, the localization system comprises an arithmetic component for deriving a distance information of the object from the detected value. The localization system also comprises a display component for displaying and/or forwarding the detected value and/or the distance information.

20 Claims, 5 Drawing Sheets

LOCALIZATION SYSTEM FOR AN EARTH MOVING MACHINE

The invention relates to a localization system for localizing an underground object for an earth-moving machine.

When carrying out earthworks and especially excavation work, it is necessary to know where underground objects, such as supply lines laid underground, are buried, in order to prevent damage, for example to supply lines and/or to the earth-moving machines used. Often, these objects are incompletely or wrongly documented or not documented at all. Accordingly, the terrain to be worked must be investigated before the beginning of the earthworks with respect to underground objects. The investigation is effected in general on the basis of the detection of electromagnetic fields which can be coordinated with the objects, for example by means of commercially available hand-held locating devices.

However, such scanning of terrain is too time-consuming and expensive, in particular for the working of large areas. It is therefore usual to mount localization devices or locating devices, such as cable detectors, directly on the earth-moving machine—for example an excavator—and to detect the buried objects in the course of the ongoing earthworks. In order to be very certain to avoid encountering objects during excavation, locating devices by means of which the depth of the buried objects can also be determined are advantageously used. For this purpose, locating devices are known which have two antennae arranged a distance apart along a perpendicular to the object. The distance from the object to the locating device can be derived from the field conditions detected by means of the antennae and the known fixed spacing of the antennae. Advantageously, the object data are stored and recorded, with the result that terrain documentations, such as maps, can be prepared or supplemented.

U.S. Pat. No. 6,633,163 describes an earth-moving machine having two magnetic field detectors arranged at different heights on the machine. The comparison of the detector measurements provides information about the closeness of a field generator to the earth-moving machine. With the system described, the relative position of the field generator to the earth-moving machine is determined. The determination of the distance from the field generator to the earth-moving machine or the depth of the field generator is not mentioned in said U.S. patent. Furthermore—owing to the arrangement of the detectors directly on the machine—the system is suitable only for earth-moving machines which pull a working part behind them.

U.S. Pat. No. 5,592,092 describes two sensors mounted a distance apart on the bucket of an excavator and intended for detecting magnetic fields of underground objects. From the known distance between the sensors, the difference between the detected field magnitudes and the bucket position, the distance from the bucket to the object is derived. Since the sensors are mounted on the excavator bucket, they are, depending on the bucket position, not perpendicularly above the object. The bucket position must therefore be taken into account when determining the distance. Moreover—owing to the fixing directly on the bucket—there is the danger that the sensors would be damaged during the excavation work.

An object of the invention is to provide a localization system for an earth-moving machine, which localization system is stable to damage and by means of which underground objects can be detected when carrying out earthworks.

A further object is the provision of a localization system for an earth-moving machine, which localization system is stable to damage and by means of which the distance to underground objects can also be determined.

These objects are achieved by the subjects of claim 1 or of the dependent claims or the achievements are further developed.

According to the invention, a localization system for an earth-moving machine has a detector component arranged in a pendulum-like manner on a fastening component. The fastening component is designed for arrangement, in particular detachable fixing, on the working part, such as the excavator arm, of the earth-moving machine. Advantageously, the fastening component can be arranged on the working part in such a way that the detector component is positioned as far as possible so that it is safe from damage. Owing to the pendulum-like arrangement of the detector component on the fastening component, the detector component is aligned under the action of gravity for different positions of the working part. Thus, a localization system having a vertically aligned detector component is provided by an arrangement which is not very complex and is stable to damage.

Thus, for example, a detector component having a design of low complexity—for example a detector component having two antennae arranged a distance apart on an axis along the vertical alignment—can advantageously be used, by means of which the distance from an object to the detector component can be determined without additional sensors and complex data evaluation algorithms being required.

The pendulum-like arrangement of the detector component on the fastening component can be realized in different ways. For example, the detector component is mounted via a flexible connecting element on the fastening component—which is, for example, simply a retaining plate. The flexible connecting element is produced, for example, from rubber or flexible plastic and connected to the detector component and the fastening component, for example by means of a screw connection, plug connection or adhesive bond. Depending on the weight of the detector component, the connecting element is more or less flexible so that, in the case of a detector component arranged via the connecting element on the fastening component, a gravity-influenced alignment thereof takes place.

The implementation of the pendulum-like arrangement can also be effected by means of a frame-like construction. Thus, the detector component can be suspended as a pendulum body in a frame—for example so as to be capable of swinging in one or two directions. The frame can also be in the form of a gimbal or gimbals for gimbal-mounting of the detector component. The frame can be mounted on the fastening component or may be the fastening component. For example, a frame forming the fastening component can be fixed magnetically on the working part.

For pendulum-like mounting of the detector component, the fastening component may also have a corresponding receptacle in which the detector component is mounted, for example via one or two bearings, such as ball bearings, or a ball joint having, for example, two degrees of rotational freedom.

By means of the arrangement, according to the invention, the detector component, a vertical alignment thereof takes place, so to speak automatically, with the result that a first measured parameter is established without additional measurements. As mentioned above, the detector component has, for example, a first and second antenna, which antennae are arranged a fixed distance apart, the antennae being arranged relative to a terrain, in the case of a detector component aligned under the influence of gravity, so that the first antenna assumes a first distance and the second antenna a second distance from the terrain, the first distance being less than the second distance—the first antenna therefore detecting a field emanating from an underground object more strongly than the second antenna. From the ratio of the antenna measurements, the distance to the object can then be determined in a simple manner.

Electromagnetic fields which can be coordinated with the objects are, for example, magnetic fields generated by alternating currents or induced magnetic fields. Thus, supply lines laid underground, such as high- or low-voltage cables, telecommunication cables or water pipes, or alternative underground objects can often be located by means of magnetic fields of the lines which vary as a function of time. The magnetic fields are generated, for example, as a result of current flows through the cables, as in the case of high- or low-voltage cables operated with alternating current. Alternatively, the fields are fields generated by application of electromagnetic signals to the lines or fields reflected by the lines. The application is effected via direct application to current-carrying supply lines or by means of induction of a magnetic field in the line. A magnetic alternating field of a current-carrying supply line can also be induced by signals from remote transmitters, such as radio signals from radio transmitters. Furthermore, the fields may emanate from transmitters on or in the lines. For example, a conductor is introduced into non-conducting supply lines, such as clay pipes or plastic pipes—or the conductor is led next to the supply lines—and is fed with alternating current.

The strength of the magnetic field is a measure of the distance from the source—i.e. from the line or from the transmitter—to the measuring location. For a straight conductor through which current flows, the strength of the magnetic field decreases inversely proportionally to the distance $d-B \approx k/d$; and in the case of a magnetic dipole field, it decreases inversely proportionally to the third power of the distance $d-B \approx k/d^3$, where k designates a proportionality constant and B is the magnitude of the magnetic field.

By means of a detector component having antennae a distance apart, as described above, a magnetic field of a source is detected at two measuring positions a distance apart, i.e. for two distances to the source. The ratio of the measured strengths of the fields can then be calculated so that the proportionality constant cancels out. The distance of the source can then be determined from the measured fields and the known relative spacing of the antennae.

A detector component of a localization system according to the invention, comprising three—or more—antennae, permits the determination of the distance of an object with greater accuracy than a detector component having two antennae.

If the detector component has antennae for detecting the field, the antennae may be uniaxial, biaxial or triaxial antennae. By mean of multiaxial antennae, the field is detectable in a plurality of spatial directions so that not only the distance but also a direction vector to the object can be determined.

As an alternative to the antennae, the detector component of the localization system according to the invention may also comprise magnetic field detectors, such as magnetometers or hall sensors.

The detector component may also be formed with a transmitter and receiver, in particular for distance measurements.

For example, the detector component is a radar, the objects being detected by means of radiation emitted by a transmitting unit of the detector component and received by a receiving unit of the detector component.

Optionally, the detector component additionally comprises a laser rangefinder, a GPS system or other optical surveying systems in order to measure the distance to the—original or worked—terrain. If the distance to an object can be determined by means of a detector component, the measurement of the position of the detector component or of the working part relative to the terrain can be used in order to determine the depth of the object. The working part can then be controlled according to the depth determined.

A position determination of the working part can also be carried out by alternative methods customary in machine control. For example, measuring a reflector on the working part is known. A position determination—for example of an excavator arm as a working arm—by means of tilt sensors and pressure sensors is likewise known.

The localization system according to the invention is in the form of a localization system for an earth-moving machine. The earth-moving machine is in particular an excavator having an excavator arm as a working part. Usually, an excavator arm is formed from a first and second boom component and an excavator bucket, which in each case are vertically adjustable. The fastening component of a localization system according to the invention is mounted on such an excavator arm, preferably on the second boom component, in such a way that it is arranged as closely as possible to the bucket but does not come into contact with the bucket in any position of the excavator arm.

The fastening component is, for example, in the form of a metal plate and can be magnetically fastened on the working part. Alternatively, the fastening component—as mentioned above—can be in the form of a frame-like holder. In the simplest case, the fastening component is a rope or belt which can be arranged on the working part—for example tied around the excavator arm and fixed—and from which the detector component will be or is suspended or into which said detector component will be or is looped. Formation of the fastening component as a housing is useful for, for example, batteries or tools for mounting the fastening component and/or detector component. If the localization system according to the invention comprises an arithmetic component, this can advantageously be housed in the housing.

The arrangement on the working part can be effected in various ways. The fastening component can be detachably fastened to the working part—for example magnetically by forming the fastening component with magnet elements. The fastening component can also be fixed on the working part, for example, by means of adhesive bonding or welding—for example, the fastening component is an inconspicuous support plate which is fixed on the working part and on which the detector component can be arranged, optionally via a connecting element or a plurality of connecting elements. The arrangement of the fastening component on the working part and/or of the detector component on the fastening component can also be realized by suspension or attachment or screw connections, snap locks, catches, click locks or clamps.

The localization system according to the invention furthermore comprises a display component for displaying the detection of the detector component. If the detection is merely a detection of an electromagnetic field, the display component can generate a warning signal on detection. The warning signal is, for example, an acoustic or optical signal for a user, such as an excavator driver. In addition or alternatively, the warning signal may be a signal for a control device of the earth-moving machine, with the result that, for example, the movement of the machine and/or of the working part thereof is stopped.

Optionally, the localization system according to the invention comprises an arithmetic component. By means of the arithmetic component, the detection of the detector component is further processed. For example, the distance to the object is derived from the detection and is optionally stored.

The arithmetic component can communicate via appropriate interfaces with the display component, which then displays or forwards the information derived by means of the arithmetic component, such as distance information.

For displaying for a user, the display component is formed, for example, as a graphic display and is arranged in a driver's cab. The detection can be shown on the display as a warning signal, for example by means of flashing or lit-up lamps. The distance information can be shown figuratively in a model of the terrain, by means of indicator lamps or as numerical values. In addition or alternatively, an acoustic alarm can be provided.

The arithmetic component is, for example, a microprocessor. Furthermore, a controller may be coordinated with the arithmetic or display component.

Detector component, display component and optionally arithmetic component and optionally controller have in each case devices for communication. The devices may be cable connections or wireless interfaces, such as Bluetooth or CANBUS. For example, the components also communicate via radio signals. The communication takes place among the individual components. The communication can furthermore take place to external devices, such as a control system operated by a user, or to control devices of the earth-moving machine.

The localization system according to the invention is described in more detail or illustrated below purely by way of example with reference to working examples shown schematically in the drawings.

Figure 1:
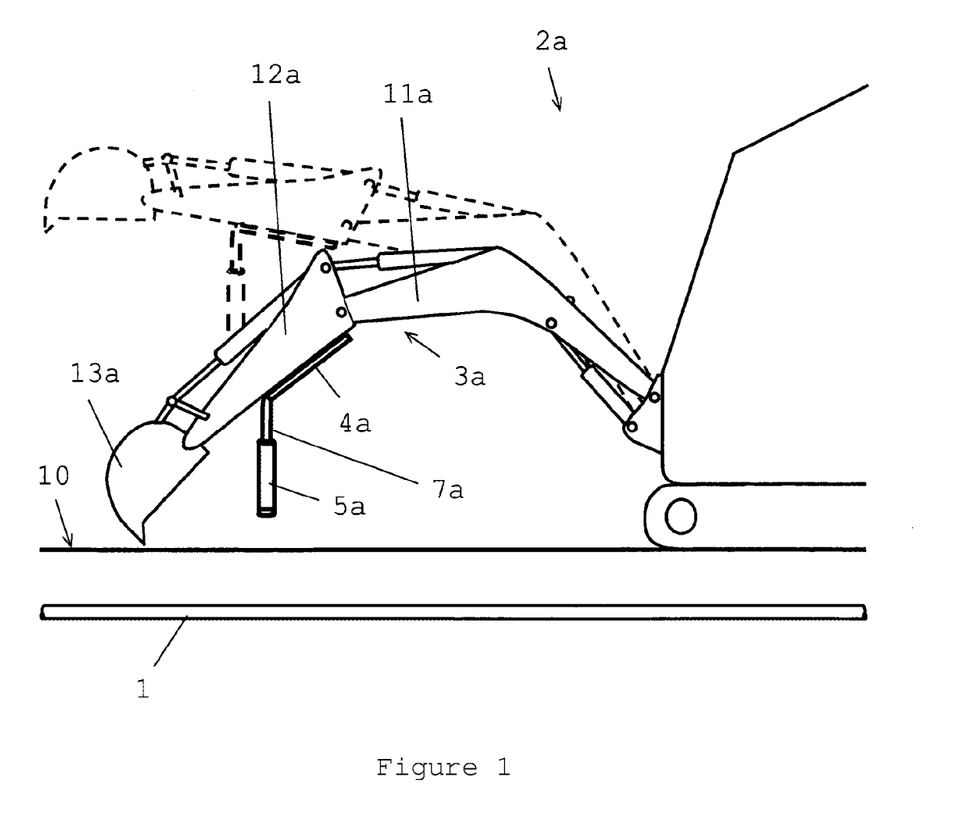
FIG. 1 shows an excavator as an earth-moving machine having a localization system according to the invention.

FIG. 1 shows an excavator 2a as an earth-moving machine having a localization system according to the invention. The excavator 2a travels over a terrain 10 on which excavation work is to be carried out. The excavation work is effected, for example, as part of the construction of a road or the laying of cables or pipes. A supply line 1 as an underground object has already been laid under the terrain to be worked, an electromagnetic field emanating from the supply line 1. The excavator 2a has, as a working part, an excavator arm 3a with a first boom component 11a, a second boom component 12a and an excavator bucket 13a, which in each case are vertically adjustable by means of hydraulic cylinders. A fastening component 4a, which in this case is in the form of a housing magnetically fastened on the second boom component and intended for a display component—not shown—of the localization system, and a flexible connecting element 7a and a detector component 5a, are arranged on the second boom component 12a as components of the localization system according to the invention. The detector component 5a is arranged indirectly via the flexible connecting element 7a on the fastening component 4a in such a way that it can swing in a pendulum-like manner in the horizontal plane. Since the connecting element 7a is flexible, alignment of the detector component 5a takes place under the action of gravity. Consequently, the detector component 5a aligns itself here in the various positions of the excavator arm 3a—a second position is indicated by dashed lines—perpendicularly to the terrain 10 and the supply line 1. The detector component 5a is formed for detecting electromagnetic radiation. As soon as radiation is detected, this detection is forwarded to a control device of the excavator 2a by means of the display component arranged in the fastening component 4a which is in the form of a housing. The forwarding is effected via radio—e.g. via Bluetooth interfaces. Display component and detector component 5a could also be arranged in a common housing—for example mounted on a circuit board.

Figure 2:
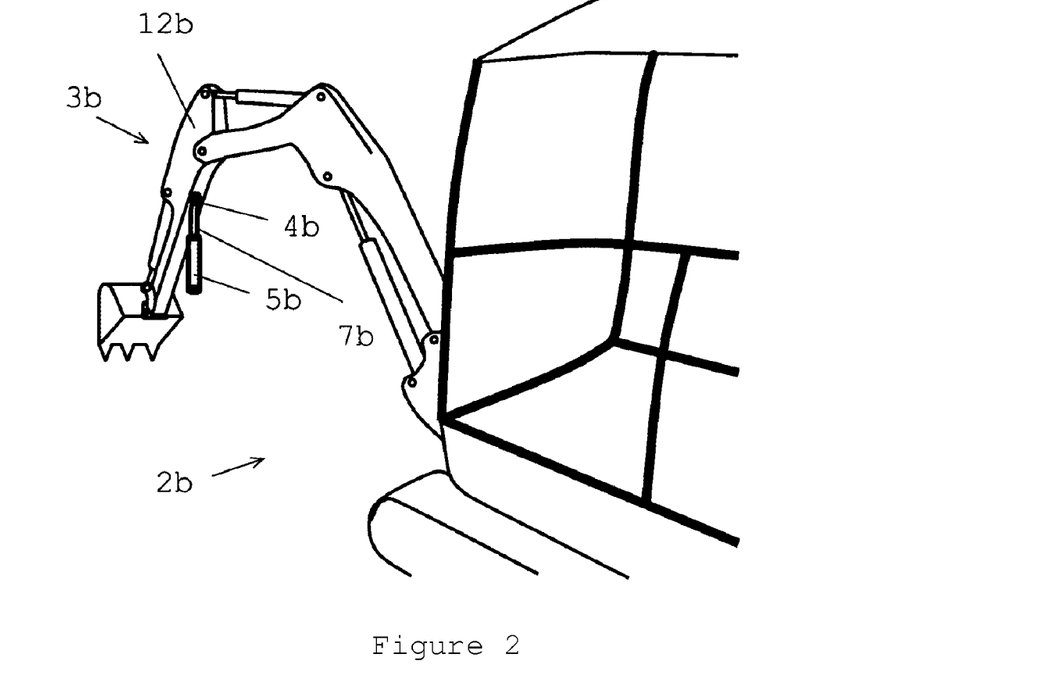
FIG. 2 shows an excavator as an earth-moving machine having components of a localization system according to the invention.

FIG. 2 once again shows an excavator 2b as an earth-moving machine having components of a localization system according to the invention. A detector component 5b is arranged in a pendulum-like manner on a round metal plate 4b as a fastening component, which is welded to the second boom 11b of the excavator arm 3b, corresponding to FIG. 1, via a flexible connecting element 7b. The display element of the localization system is not shown.

Figure 3:
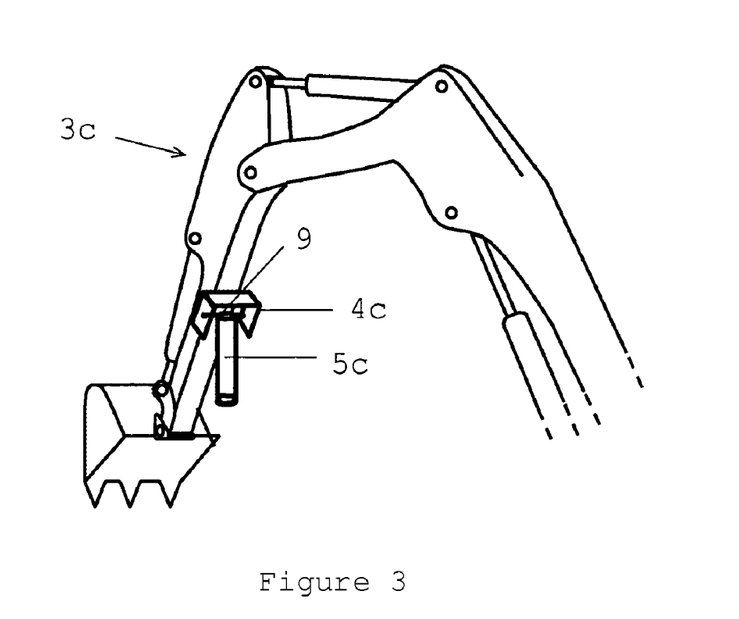
FIG. 3 shows an embodiment for the pendulum-like arrangement of a detector component on a fastening component of a localization system according to the invention.

FIG. 3 shows a further alternative of a pendulum-like arrangement of a detector component 5c of a localization system according to the invention on a fastening component thereof. The fastening component is fixed on an excavator arm 3c and is in the form of a frame 4c in which the detector component 5c is suspended so as to be pivotable about an axis 9.

Figure 4:
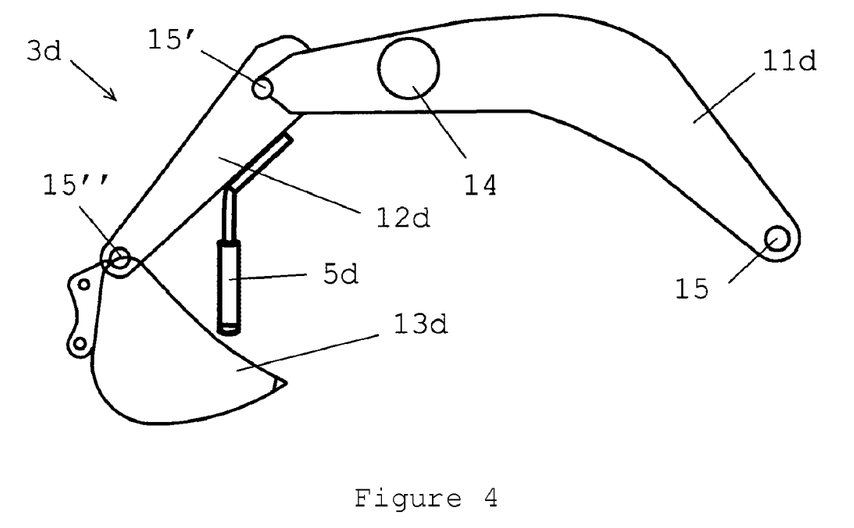
FIG. 4 shows components of a localization system according to the invention on an excavator arm.

The diagram in FIG. 4 shows an excavator arm 3d having components of a localization system according to the invention. The diagram shows that the detector component 5d of the localization system is arranged in such a way that it is arranged as close as possible to the excavator bucket 13d but sufficiently far away that it does not make contact with the bucket. Furthermore, a reflective element 14 is mounted on the excavator arm 3d. The reflective element 14 can be measured by means of a tacheometer and the position of the element can thus be determined. Further sensors are coordinated with the excavator arm 3d: in each case pressure sensors 15, 15', 15" are coordinated with the hydraulic cylinders (not shown) for adjusting the first boom component 11d and the second boom component 12d of the excavator arm 3d, and the excavator bucket 13d. Furthermore, in each case a tilt sensor is coordinated with the first boom component 11d, the second boom component 12d and the excavator bucket 13d. The tilt sensors are not shown. By means of the reflective element 14 and the sensors, the position of the lower edge of the bucket can be calculated. If the distance to an underground object is now determined via the localization system, the depth of the object can be determined with the knowledge of the position of the excavator arm 3d—and hence of the detector component 5d which has a fixed positional relationship with the excavator arm 3d.

Figure 5:
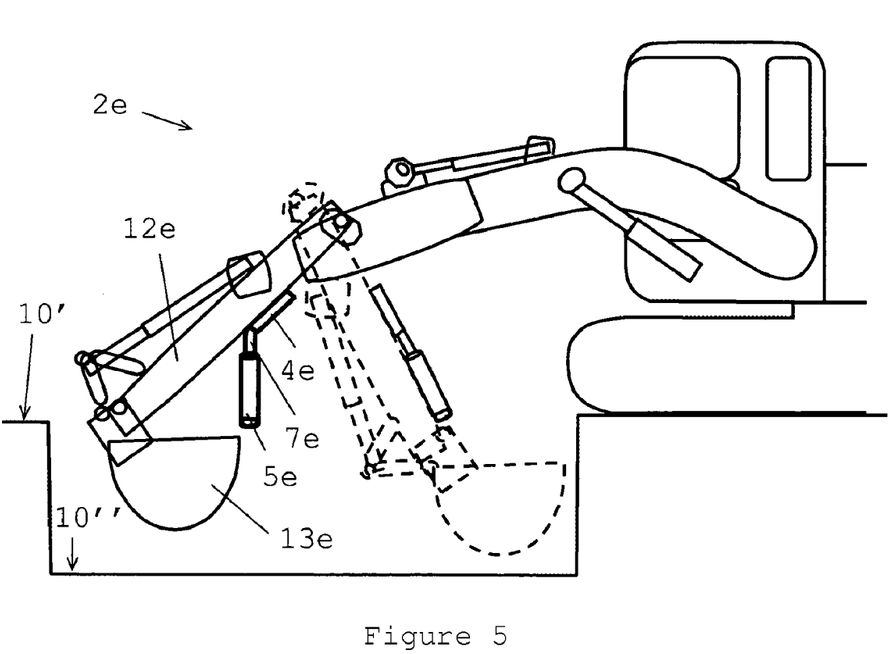
FIG. 5 shows an excavator having a fixing, connecting and detector component of a localization system according to the invention.

By means of the excavator in FIG. 5, an excavation is carried out in a terrain 10'. A detector component 5e is arranged in a pendulum-like manner via a fastening component 4e and a connecting component 7e on the excavator arm, on the boom component 12e which is connected in a rotatable manner to the bucket 13e. The detector component 5e is designed, according to the following FIG. 7E with antennae and a laser rangefinder. By measuring the distance to the terrain—in this case, for example, to the excavated terrain 10"—with the laser rangefinder, the depth of a detected object can be determined from a distance to the object which has been calculated from the detection data of the detector component 5e. The diagram shows that the arrangement of the detector component 5e via the connecting element 7e and the fastening component 4e on the boom component 12e is such that the detector component 5e does not come into contact with the bucket 13e even when said bucket is completely swivelled in—and is thus protected from damage by the bucket 12e. When the boom component 12e is retracted—as in the position shown by dashed lines—the detector component rests on the boom component. When the excavator is being transported—when the excavator is therefore not being actively used—the detector component 5e and optionally the further components can simply be removed. It is also possible to provide a fixing device for the detector component 5e so that the latter can be fixed and does not swing—for example during transport of the excavator or if the terrain has already been sufficiently accurately documented with respect to underground objects.

Figure 6:
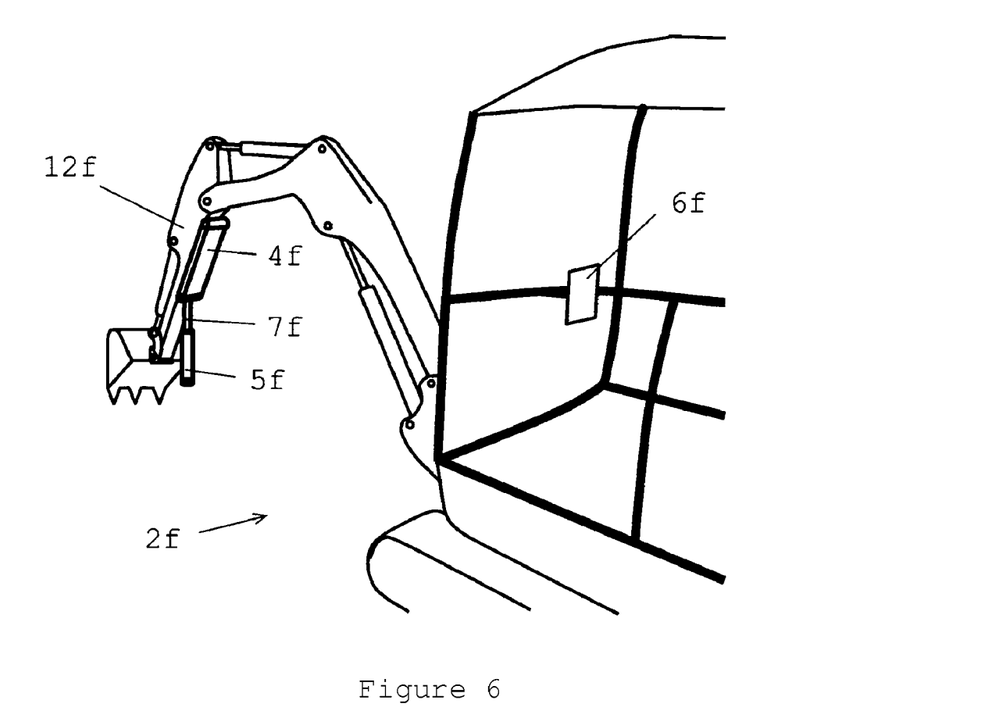
FIG. 6 shows a further working example of a localization system according to the invention.

FIG. 6 shows a working example of a localization system according to the invention, comprising a fastening component in the form of housing 4f for the arithmetic component. The detecting component 5f is arranged in a pendulum-like manner on the housing 4f via a connecting element 7f. The fastening component is—according to the preceding figures—mounted on the front boom component 12f of an excavator 2f. The housing 4f as a fastening component has, on the back of the housing, magnetic strips via which it is magnetically fastened to the front boom component 12f. The magnetic fastenability permits rapid and easy mounting and removal of the housing 4f. In the driver's cab of the excavator 2f, a display component 6f which comprises a graphic display is arranged. The display component 6f is, for example, formed according to the working example shown subsequently in FIG. 8.

FIGS. 7A-7F show in somewhat more detail the detector component 5f, the connecting element 7f and the fastening component from FIG. 6. The fastening component is in the form of housing 4f for a battery compartment 16 and an arithmetic component 8f (cf. FIG. 7C).

Figures 7A, 7B:
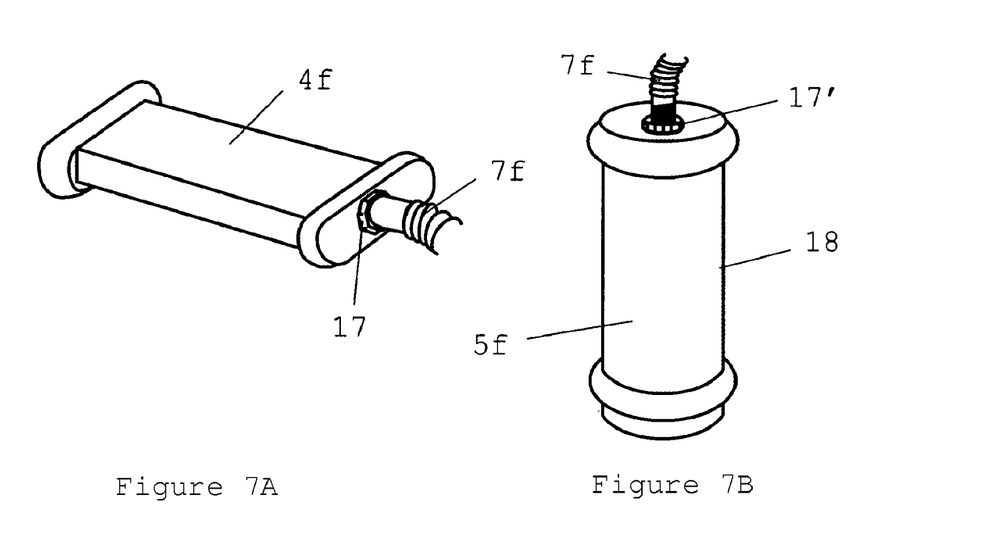
FIG. 7 shows, in six partial figures, working examples relating to components of a localization system according to the invention.
Figure 7C:
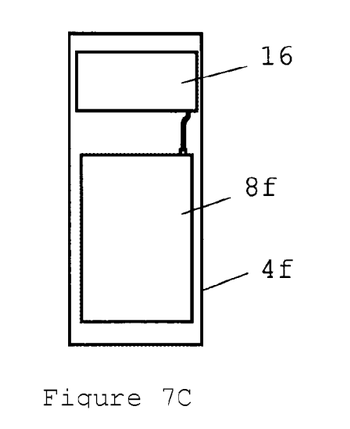

The connecting element 7f is in the form of a bellows and consists of flexible plastic material. The connecting element 7f is firmly screwed both to the housing 18 of the detector component 5f and to the fastening component via screw means 17, 17'.

Figure 7D:
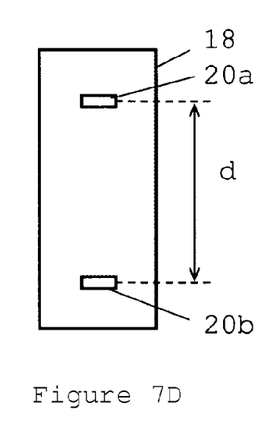
Figure 7E:
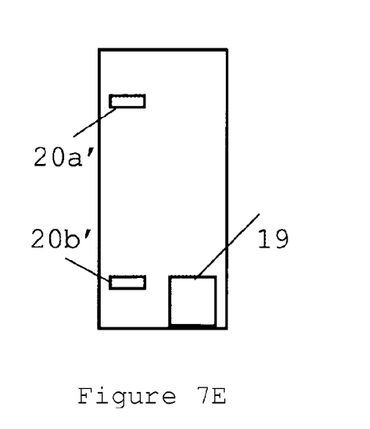
Figure 7F:
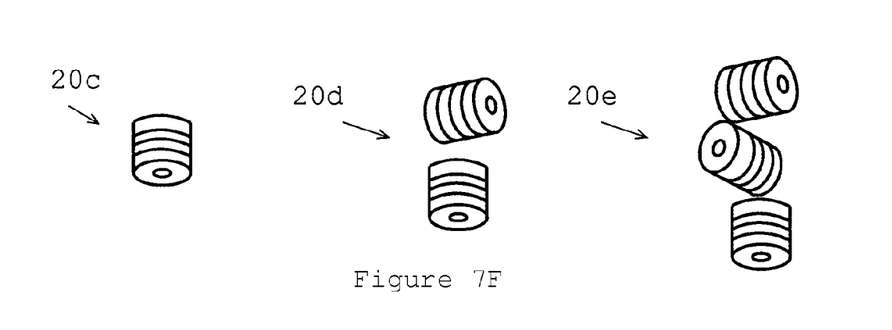

The detector component 5f has a first antenna 20a and a second antenna 20b, which antennae are arranged a known axial distance d apart in a housing 18 (cf. FIG. 7D). FIG. 7E shows a working example of a detector component which likewise has a first and second antennae 20a' and 20b' arranged a fixed distance apart and additionally a laser rangefinder 19. The antennae are, for example, designed in each case with a coil or with a plurality of coils as the uniaxial antenna 20c, the biaxial antenna 20d and the triaxial antenna 20e from FIG. 7f. A time-variable magnetic field of an underground conductor induces a voltage between the ends of the coil or of the coils of the antennae, which induced voltage depends on the magnitude of the magnetic field. A distance value of the conductor is derived from the antenna outputs in the arithmetic component 8f. The derivation may be, for example, simply an assignment of a distance value to the antennae outputs.

Figure 8:
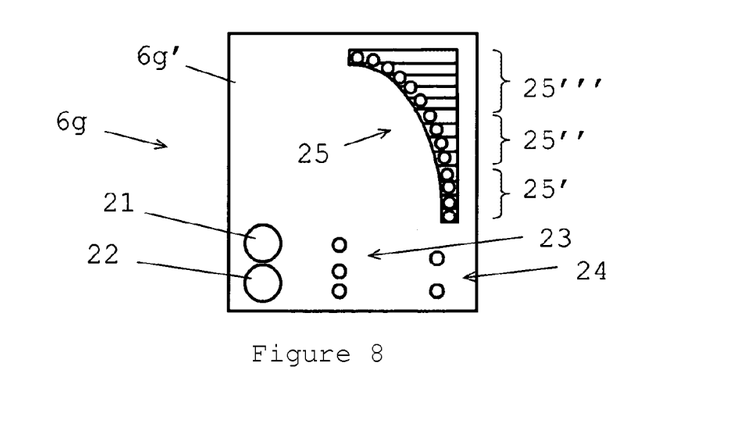
FIG. 8 shows a working example for a display component of a localization system according to the invention.

FIG. 8 shows a working example for a display component 6g of a localization system according to the invention. The display component 6g has a graphic display 6g' and is in the form of a display and control unit. A multiplicity of LEDs as visual display means and a plurality of push-button switches for selecting settings are formed on the graphic display 6g'. Here, the push-button switch is a "mute" push-button switch 21 for silencing an acoustic alarm which is provided in addition to the visual alarm signals. With a further push-button switch 22, the localization system can be switched to "standby" or "active". LEDs 23 associated with the push-button switches indicate, by lighting up, which setting is active. Two further LEDs 24 indicate the battery level of the arithmetic component 8f and detector component 5f and of the display 6g'. The LEDs 25 in the upper region of the display 6g' represent a visual display of distance information with a respect to a detected underground object. They are divided into three colour sections—green, yellow, red. If the green LEDs 25' light up, an underground object has been detected which, however, is still a distance of more than 30 cm away. The lighting up of the yellow LEDs 25" indicates that the object has now assumed a distance of less than 30 cm. When the red LEDs 25'" light up, the object is less than 10 cm away and the highest alarm level prevails.

The invention claimed is:

1. A localization system for localizing an underground object for an earth-moving machine which has a working part, comprising:
   a fastening component;
   a detector component arranged indirectly or directly on the fastening component that is configured to detect the object on the basis of an electromagnetic field; and
   a display component for displaying and forwarding, respectively, the detector signal and/or evaluations of the detector signals, wherein the detector component is arranged in a pendulum-like manner on the fastening component so that the detector component is aligned under the action of gravity.

2. A localization system according to claim 1, wherein the underground object includes a supply line and the working part includes an excavator arm.

3. A localization system according to claim 1, wherein:
   the fastening component is arranged on the working part; and
   the electromagnetic field is assigned to the object.

4. A localization system according to claim 1, further comprising an arithmetic component for evaluating the detector signal.

5. A localization system according to claim 4, wherein the arithmetic component is configured to derive and store distance information with respect to the object.

6. A localization system according to claim 1, wherein the detector signal includes distance information.

7. A localization system according to claim 1, wherein the detector component has a first antenna and a second antenna for detecting the electromagnetic field, which antennae are arranged at a fixed distance relative to one another so that the distance from the detector component to the object can be derived from the ratio of the strengths of the field detected by means of the first antenna and second antenna.

8. A localization system according to claim 1, wherein the detector component is arranged via a flexible connecting element on the fastening component.

9. A localization system according to claim 1, wherein the detector component is arranged via a flexible connecting element comprising a plastic or rubber material on the fastening component.

10. A localization system according to claim 1, wherein the fastening component includes a frame and the detector component is arranged in the frame so as to be pivotable about an axis.

11. A localization system according to claim 1, wherein the fastening component includes a receptacle and the detector component is mounted by means of a joint in the receptacle.

12. A localization system according to claim 1, wherein the fastening component includes a receptacle and the detector component is mounted by means of a ball joint in the receptacle.

13. A localization system according to claim 1, wherein the fastening component is magnetically fastenable.

14. A localization system according to claim 1, wherein the display component:
   displays the detection and/or the distance information to a user; and/or
   forwards the detection and/or the distance information to a control device of the earth-moving machine.

15. A localization system according to claim 1, wherein the display component forwards the detection and/or the distance information to an actuating device of the working part.

16. A localization system according to claim 1, wherein the display component includes a graphic display.

17. A localization system according to claim 1, wherein the display component has:
   visual display means, such as LEDs; and/or
   acoustic display means.

18. A localization system according to claim 1, wherein the fastening component is in the form of a housing for:
   the arithmetic component; and/or
   the display component.

19. A localization system according to claim 1, wherein a rangefinder which is coordinated with the localization system is provided.

20. A localization system according to claim 1, wherein a rangefinder which is coordinated with the localization system and is arranged on the detector component is provided.

* * * * *